(12) United States Patent
Rhee

(10) Patent No.: US 9,285,901 B2
(45) Date of Patent: Mar. 15, 2016

(54) ELECTRONIC DEVICE FOR RECOGNIZING ASYNCHRONOUS DIGITAL PEN AND RECOGNIZING METHOD THEREOF

(71) Applicant: Samsung Electronics Co., Ltd., Suwon-si, Gyeonggi-do (KR)

(72) Inventor: Bong-Jae Rhee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 14/096,577

(22) Filed: Dec. 4, 2013

(65) Prior Publication Data

US 2014/0191967 A1 Jul. 10, 2014

(30) Foreign Application Priority Data

Jan. 4, 2013 (KR) .................. 10-2013-0001021

(51) Int. Cl.
*G06F 3/033* (2013.01)
*G06F 3/0354* (2013.01)
*G06F 3/043* (2006.01)

(52) U.S. Cl.
CPC ............ *G06F 3/03545* (2013.01); *G06F 3/043* (2013.01); *G06F 3/0433* (2013.01)

(58) Field of Classification Search
None
See application file for complete search history.

(56) References Cited

U.S. PATENT DOCUMENTS

| | | | |
|---|---|---|---|
| 6,384,814 B1* | 5/2002 | Kobayashi et al. | 345/179 |
| 2003/0063065 A1* | 4/2003 | Lee et al. | 345/156 |
| 2004/0080498 A1* | 4/2004 | Fujiwara et al. | 345/179 |
| 2008/0169132 A1* | 7/2008 | Ding et al. | 178/19.02 |
| 2009/0009489 A1 | 1/2009 | Lee | |
| 2010/0231558 A1 | 9/2010 | Kwak | |
| 2010/0234077 A1 | 9/2010 | Yoo et al. | |
| 2012/0105314 A1 | 5/2012 | Lee | |

FOREIGN PATENT DOCUMENTS

KR 10-2012-0072179 A 7/2012

* cited by examiner

*Primary Examiner* — Joseph Feild
*Assistant Examiner* — Ifedayo Iluyomade
(74) *Attorney, Agent, or Firm* — Jefferson IP Law, LLP

(57) ABSTRACT

An electronic device for receiving an input by a digital pen having a waveform generation means is provided. The electronic device includes at least three reception sensors and a processor. The at least three reception sensors are installed in the electronic device at positions that are separated from one another, and are configured to receive a waveform generated by the waveform generator of the digital pen. The processor is configured to calculate an input coordinate of the digital pen using a difference of velocities and reception times of the waveform received by the at least three reception sensors.

16 Claims, 14 Drawing Sheets

ELECTRONIC DEVICE FOR RECOGNIZING ASYNCHRONOUS DIGITAL PEN AND RECOGNIZING METHOD THEREOF

CROSS-REFERENCE TO RELATED APPLICATION(S)

This application claims the benefit under 35 U.S.C. §119(a) of a Korean patent application filed on Jan. 4, 2013 in the Korean Intellectual Property Office and assigned Serial No. 10-2013-0001021, the entire disclosure of which is hereby incorporated by reference.

TECHNICAL FIELD

The present disclosure relates to an electronic device for recognizing a digital pen and a recognizing method thereof.

BACKGROUND

With rapid development of an electronic communication technology, a peripheral device attached to or additionally used for an electronic device also develops. For example, for the peripheral device, there exists an auxiliary memory card, an ear microphone mounted and installed in an electronic device to allow communication with a counterpart user, a Bluetooth headset for performing short distance wireless communication via a Bluetooth module mounted in the electronic device, and a stylus pen which is a kind of a digital pen used to manipulate a touchscreen unit for performing input and output simultaneously.

Recently, a so-called smartphone is mainly used as a representative electronic device, and the smartphone indispensably has a touchscreen unit performing input/output of data simultaneously using a large-sized screen with consideration of use convenience.

A touch panel used for the touchscreen unit is roughly classified into various touch panels such as a resistive touch panel, a capacitive touch panel, an ultrasonic touch panel, a light (infrared) sensor type touch panel, a touch panel using an electromagnetic resonance, etc.

To increase convenience and variety in touch, the electronic device having the above-described various types of touchscreen unit has a stylus pen of a predetermined length, whose end has a pointed tip so that it is detachable from the inside of the electronic device. For example, an electronic device having a resistive touchscreen may have a construction where a stylus pen has a simply pointed end and touches the touchscreen with a predetermined pressure. Also, in a case of a capacitive touch panel, it is preferable that a tip contacting the touchscreen is formed of a conductive material and applied.

Meanwhile, a method using an electromagnetic resonance requires a sensor pad (referred to as a 'digitizer') arranged in an array configuration for generating electromagnetic resonance at the lower portion of a display screen on which pen input is performed, and detection is possible only within a detect region of the sensor pad.

However, since this method requires a magnetic material and a coil body inside a pen and requires a flat-shaped sensor pad also inside an electronic device, the structure is complicated and manufacturing costs increase. Also, in the method using an ultrasonic wave, when a pen generates an ultrasonic wave, a time until a receiver provided to an electronic device receives the ultrasonic wave is measured, and a distance between the receiver and the pen is calculated from the propagation velocity of an ultrasonic wave and the time until the ultrasonic wave is received. Therefore, unlike the electromagnetic resonance method, the method using the ultrasonic wave does not require the sensor pad of array configuration and the detect region is relatively wide. The above-described related-art ultrasonic wave method uses a method of measuring distances between two or more receivers and a pen, and calculating the coordinate of the pen using triangle drawing. This method may accurately measure a time until an ultrasonic wave is received only when a receiver knows an accurate point at which the pen generates the ultrasonic wave. Therefore, there is a need for a more reasonable measurement method.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for recognizing an asynchronous digital pen so as not to require a separate synchronization means.

Another aspect of the present disclosure is to provide an electronic device and a method for recognizing an asynchronous digital pen, realized to contribute to slimness of the electronic device by excluding a synchronization means that should be added.

Still another aspect of the present disclosure is to provide an electronic device and a method for recognizing an asynchronous digital pen, realized to contribute to manufacturing cost reduction by excluding a synchronization means.

In accordance with an aspect of the present disclosure, an electronic device for receiving an input by a digital pen having a waveform generator is provided. The electronic device includes at least three reception sensors installed in the electronic device at positions that are separated from one another, and are configured to receive a waveform generated by the waveform generator of the digital pen, and a processor configured to calculate an input coordinate of the digital pen using a difference between a velocity of the waveform received by the at least three reception sensors and a reception time.

In accordance with an aspect of the present disclosure, at least one of the at least three reception sensors is not disposed on a line between at least two other of the at least three reception sensors.

More preferably, the reception sensors may be disposed in a region of the electronic device other than a display region of a display unit provided to the electronic device. However, they are not limited thereto but the at least three reception sensors may be disposed in the display region without influencing device units.

In accordance with an aspect of the present disclosure, the waveform generator may be an ultrasonic wave generating unit, and the at least three reception sensors may be ultrasonic reception sensors. Also, the waveform generator may be a vibration generating unit, and the at least three reception sensors may be vibration reception sensors. However, they are not limited thereto but various types of generator for generating a pulse-shaped waveform or a modulated continuous waveform may be used.

In accordance with another aspect of the present disclosure, a method for calculating an input coordinate of a digital pen having a waveform generator in an electronic device including at least three reception sensors is provided. The method includes determining a difference of at least two reception times of waveforms received from the at least three reception sensors, respectively, and determining an input coordinate of the digital pen using the determined deference of at least two reception times and a velocity of the waveform set in advance.

Other aspects, advantages and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
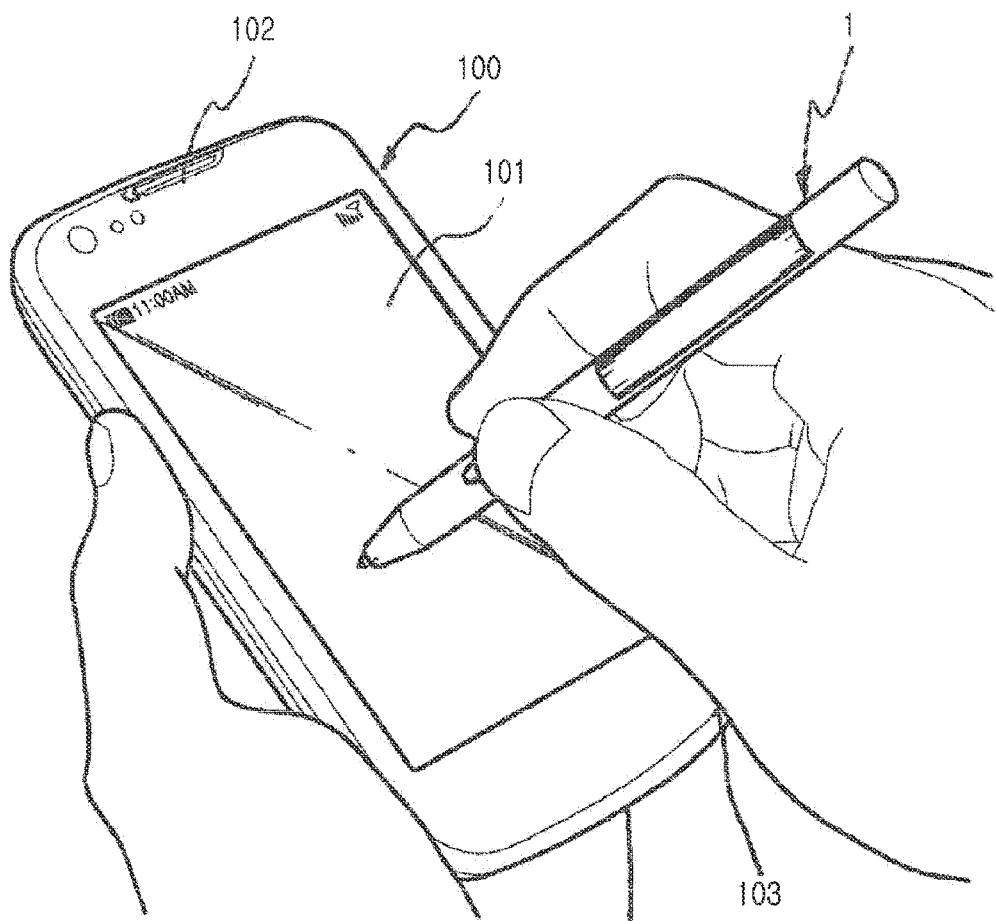
FIG. 1 is a view illustrating a state of an electronic device for recognizing an asynchronous digital pen in use according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the present disclosure, for the electronic device, a portable terminal for communication having a composite touchscreen unit has been illustrated and described, but it is not limited thereto. For example, the electronic device may include various apparatuses having a composite touchscreen unit, that is, a Personal Digital Assistant (PDA), a laptop computer, a smartphone, a netbook, a Mobile Internet Device (MID), an Ultra Mobile Personal Computer (UMPC), a tablet Personal Computer (PC), a navigation, a digital audio player, a TeleVision (TV), a remote controller applied thereto, etc.

Particularly, in the case where the TV is applied as an electronic device, the remote controller may be realized to replace the function of a digital pen as a pointing device.

Also, according to the present disclosure, a digital pen has an ultrasonic wave generating unit, and an electronic device has at least three reception sensors for receiving an ultrasonic wave but they are not limited thereto. For example, various waveform generators that may generate a waveform may be provided to the digital pen. The waveform generator may be replaced by a vibration generator. That is, the present disclosure is applicable to various systems where respective reception sensors may receive with a predetermined time difference a waveform generated by a waveform generator provided to the digital pen.

Furthermore, according to the present disclosure, besides reception sensors for receiving a coordinate via the digital pen, a separate touch panel (for example, a capacitive touch panel) that may detect a touch by a user's hand is applied to a display unit of the electronic device, but the present disclosure is not limited thereto and a position may be detected by the digital pen independently.

FIG. 1 is a view illustrating a state of an electronic device for recognizing an asynchronous digital pen in use according to an embodiment of the present disclosure.

A portable terminal has been illustrated as an electronic device 100. The electronic device 100 includes a display unit 101 on its front side, a speaker unit 102 on the upper side of the display unit 101, and a microphone unit 103 on its lower side.

Also, for a data input unit using the display unit 101, a digital pen 1 has been applied. Though the present disclosure uses the digital pen 1 as a coordinate input tool. The digital pen 1 may be also be referred to as a 'stylus' pen. The digital pen 1 has an ultrasonic wave generator (e.g., ultrasonic wave generator 10 of FIG. 2) at its end. The ultrasonic wave generator may be realized to generate an ultrasonic wave constantly. In this case, the digital pen 1 received in the electronic device 100 may detect it is separated from the electronic device to generate an ultrasonic wave constantly. In this case, the electronic device 100 may detect the digital pen 1 is separated from the electronic device 100 to automatically enter an ultrasonic wave input mode.

Also, the digital pen 1 may generate an ultrasonic wave for only a time intended by a user's manipulation. For example, the user may generate an ultrasonic wave by pressing a button protruded on a portion of the digital pen 1. Also, in the case where the digital pen 1 inputs data two-dimensionally by contacting the surface of the display unit 101, the user may generate an ultrasonic wave by pressing a tip installed at the end of the digital pen 1.

Though not shown, the electronic device 100 may have a touch panel separately from a Liquid Crystal Display (LCD) module provided as the display unit to receive data input by a user's hand touch in the case where the digital pen 1 is not used.

Figure 2:
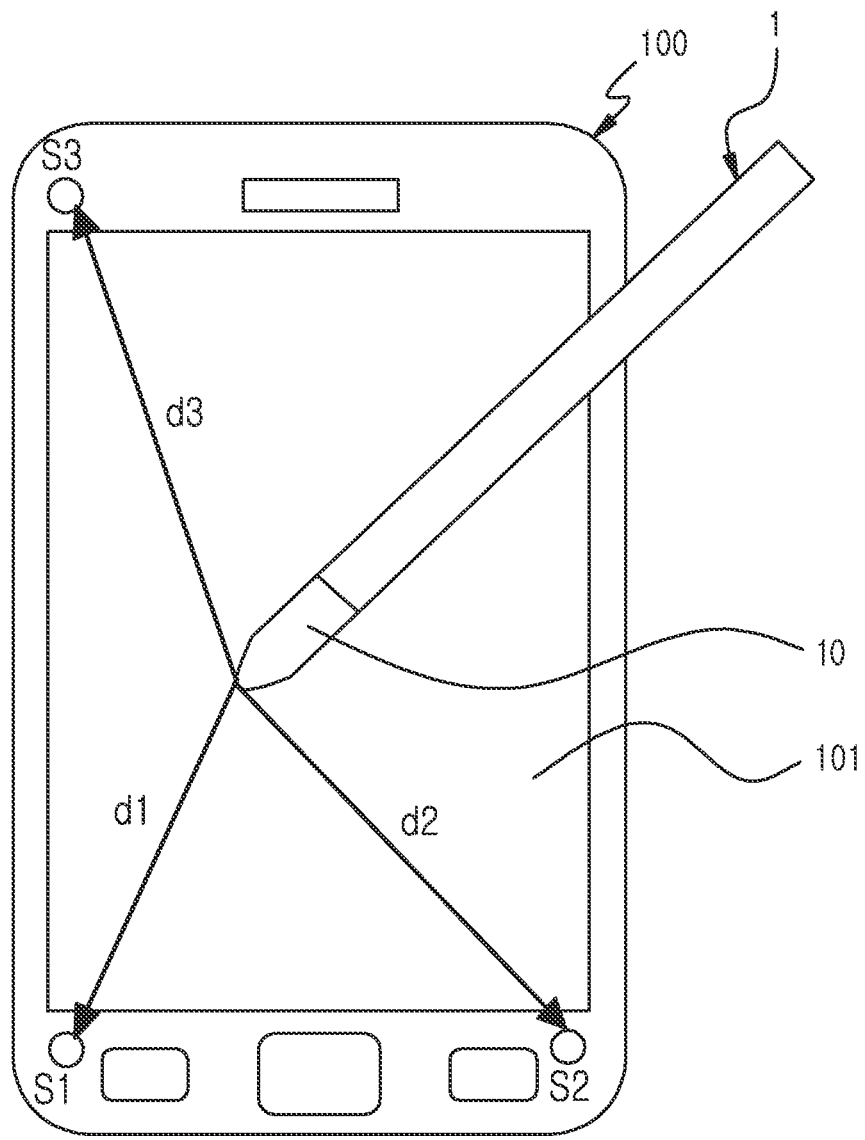
FIG. 2 is a view illustrating an electronic device where the digital pen of FIG. 1 and reception sensors are disposed according to an embodiment of the present disclosure.

FIG. 2 is a view illustrating an electronic device where the digital pen of FIG. 1 and reception sensors are disposed according to an embodiment of the present disclosure.

According to the present disclosure, at least three ultrasonic reception sensors S1, S2, and S3 separated with a predetermined interval are disposed at appropriate positions of the electronic device 100. Preferably, at least one of the ultrasonic reception sensors S1, S2, and S3 should not be installed on a straight line. Also, it is preferable that these reception sensors S1, S2, and S3 are installed at the edge region excluding the display 101 of the electronic device 100.

Hereinafter, a method for detecting the input position of the digital pen 1 using the above ultrasonic reception sensors S1, S2, and S3, which sense ultrasonic waves generated by the ultrasonic wave generator 10, is described below.

Figure 3:
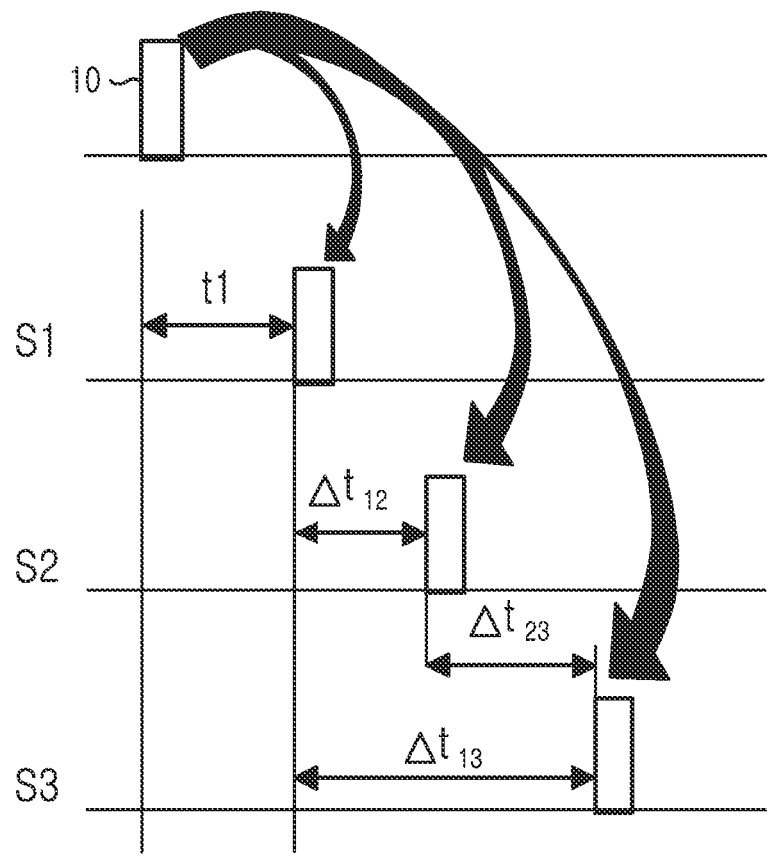
FIG. 3 is a schematic view illustrating a time difference related to ultrasonic signal transfer between respective reception sensors and the digital pen of FIG. 2 according to an embodiment of the present disclosure.
Figure 4A:
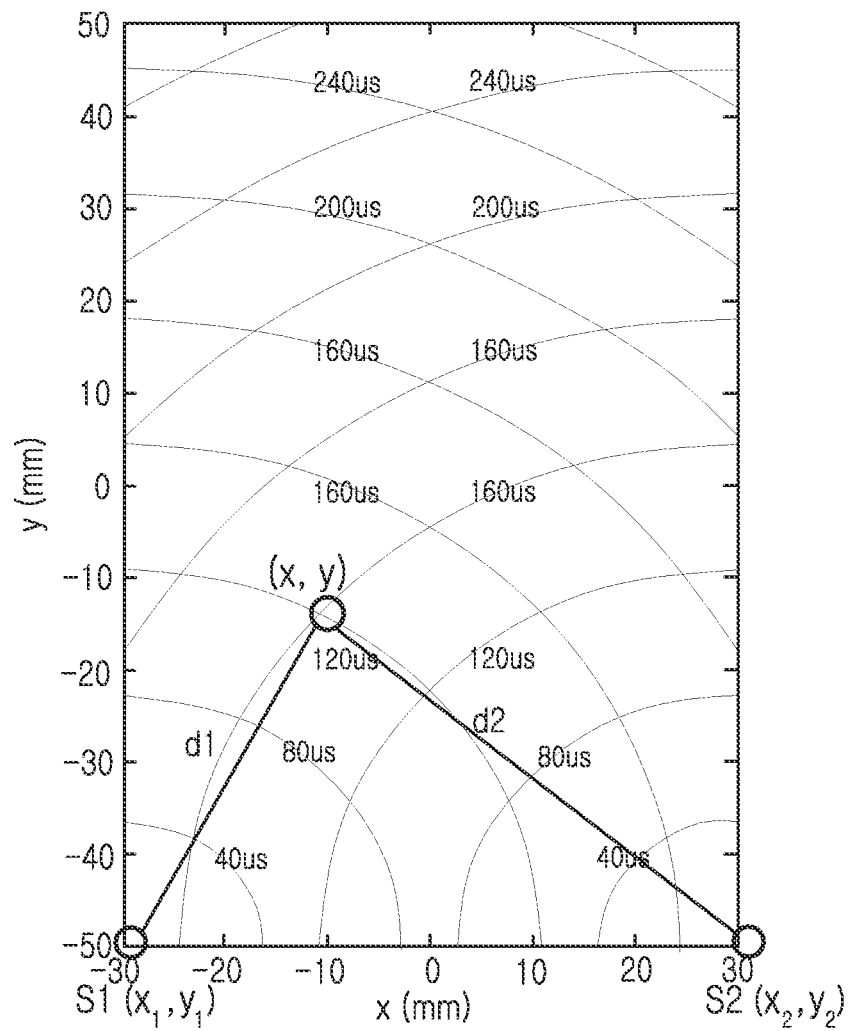
FIG. 4A is a graph measuring a coordinate of a digital pen by a synchronization means according to the related art.

FIG. 3 is a schematic view illustrating a time difference related to ultrasonic signal transfer between respective reception sensors and the digital pen of FIG. 2 according to an embodiment of the present disclosure; FIG. 4A is a graph measuring a coordinate of a digital pen by a synchronization means according to the related art; and FIG. 4B is a graph measuring the coordinate of a digital pen, and illustrating correlation between a coordinate of a digital pen and time difference between respective reception sensors, according to an embodiment of the present disclosure.

Figure 4B:
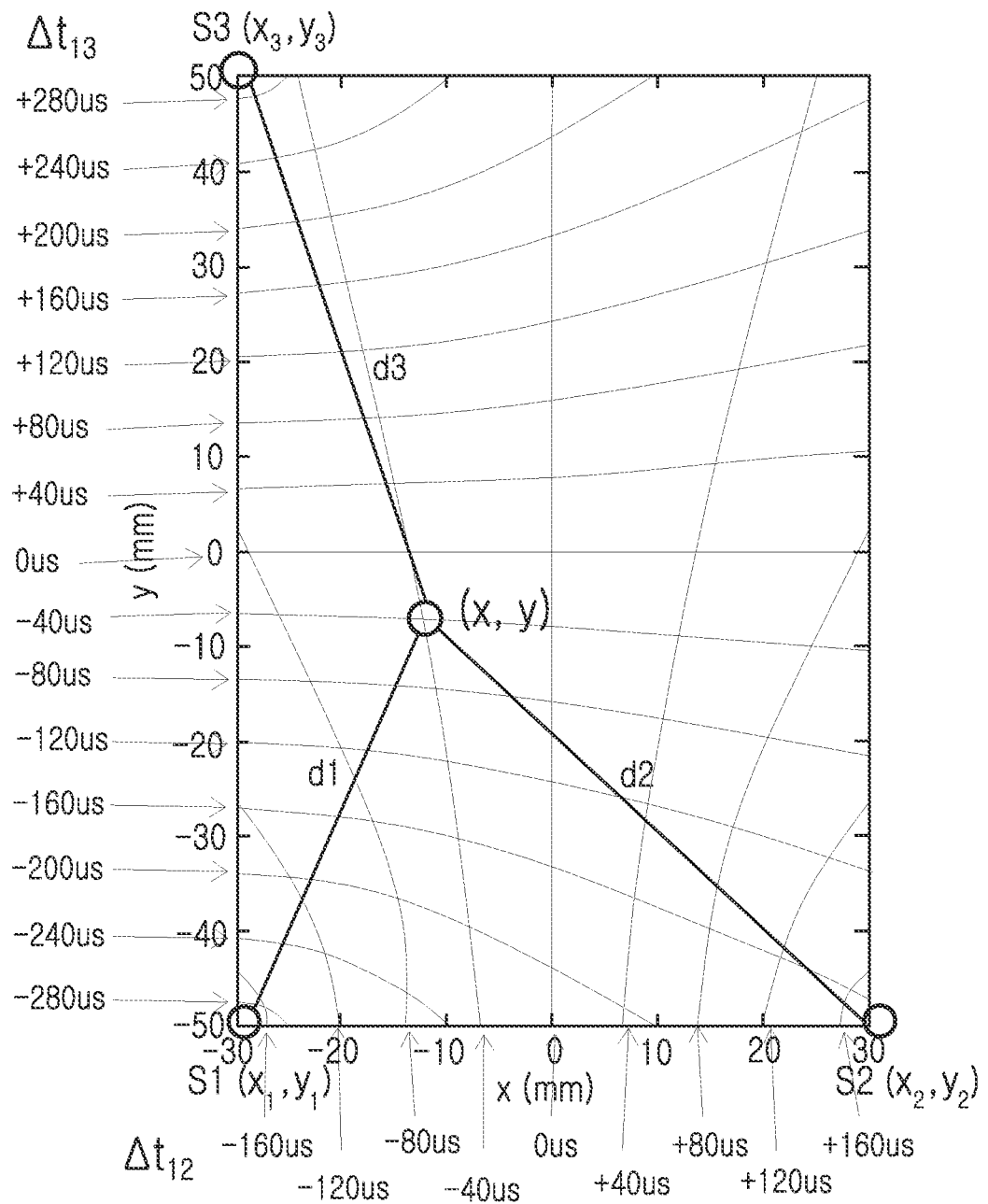
FIG. 4B is a graph measuring a coordinate of a digital pen, and illustrating correlation between the coordinate of the digital pen and time difference between respective reception sensors, according to an embodiment of the present disclosure.

Referring to FIGS. 3, 4A, and 4B, reception sensors for receiving an ultrasonic wave are represented by S1, S2, S3, respectively, and times consumed until ultrasonic waves generated by the ultrasonic wave generator 10 of the digital pen 1 are received by the respective reception sensors is represented by t1, t2, t3, respectively. In this structure, since means for synchronizing the digital pen 1 with the electronic device 100 does not exist, an accurate generation point at which the digital pen 1 has generated an ultrasonic wave cannot be known, but the coordinate of the digital pen 1 may be calculated using a difference between points at which the ultrasonic waves have been received by the respective reception sensors S1, S2, S3.

When a time of a reception side and a time of a generating side are not accurately synchronized in the present disclosure and generating time information is not transferred to the reception side using other methods excluding an ultrasonic wave, it is not possible to measure t1 which is a time consumed until a generated signal is transferred to the sensor S1 as illustrated in FIG. 3. However, since time points at which the respective reception sensors have received a signal are measured, a reception time difference between the sensors may be easily measured.

Though FIG. 3 illustrates a pulse-shaped generated waveform for convenience in description, the generated waveform may have waveforms of various shapes. For example, a continuous waveform obtained by Frequency Modulation (FM)-modulating a specific frequency may be used. A receiver may perform FM demodulation and extract a specific frequency, and each receiver may detect a time difference using a phase difference of the extracted specific frequency. Besides, various modulation/demodulation methods such as Phase Modulation (PM), Phase Shift Keying (PSK), etc. may be utilized. Also, this generation waveform may include modulated various state information of the pen including the state of the button positioned on the digital pen.

Meanwhile, assuming that times for which an ultrasonic wave is transferred from the digital pen 1 to the reception sensors S1, S2, S3 are t1, t2, t3, respectively, time differences between time points at which the respective sensors receive an ultrasonic wave may be expressed as follows.

$$\Delta t_{12} = t1 - t2$$

$$\Delta t_{23} = t2 - t3$$

$$\Delta t_{13} = t1 - t3$$

Here, since $\Delta t_{13} = \Delta t_{13} + \Delta t_{23}$, $\Delta t_{12}$, $\Delta t_{23}$, and $\Delta t_{13}$ are subordinated to one another. However, when two are selected from $\Delta t_{12}$, $\Delta t_{23}$, and $\Delta t_{13}$, a subordinate relation does not exist, so that they may be used for calculating a 2 Dimensional (2D) coordinate. Hereinafter, for convenience in description, an operation is described mainly using $\Delta t_{12}$ and $\Delta t_{13}$.

Assuming that the propagation velocity of an ultrasonic wave is Vs and a distance from the pen to the respective sensors are d1, d2, d3, non-linear simultaneous equations may be formed as in Equation (1).

$$\begin{aligned}
1) \quad & d1 - d2 = [(x-x_1)^2 + (y-y_1)^2]^{1/2} - [(x-x_2)^2 + (y-y_2)^2]^{1/2} = \Delta t_{12} Vs \\
2) \quad & d1 - d3 = [(x-x_1)^2 + (y-y_1)^2]^{1/2} - [(x-x_3)^2 + (y-y_3)^2]^{1/2} = \Delta t_{13} Vs
\end{aligned} \quad \text{Equation (1)}$$

where d1, d2, d3 are respective distances from the respective sensors S1, S2, S3 to a currently input pointing position of the digital pen, $(x_1, y_1)$ is a coordinate of the sensor S1, $(x_2, y_2)$ is a coordinate of the sensor S2, and $(x_3, y_3)$ is a coordinate of the sensor S3. Also, Vs is a velocity (for example, 340 m/s) of an ultrasonic wave set in advance used for a calculation equation in the electronic device. (x, y) is a current coordinate of the digital pen to detect.

Therefore, coordinate (x, y) of the pen may be calculated using Equation (1) as simultaneous equations. Since this calculation should solve non-linear equations, the equations should be solved with respect to $\Delta t_{12}$ and $\Delta t_{13}$ in advance, and a high look-up table may be used.

Therefore, compared to the related-art method, the present disclosure does not require a separate circuit that uses Infra-Red (IR) or Radio Frequency (RF) for synchronization between the digital pen and the reception sensor, so that elements of the digital pen which is a generating side is more simplified. Also, a reception side does not require an IR or RF circuit and only an ultrasonic sensor is further added, so that the reception side is also simplified even more.

Compared to the related-art method, the related-art method uses a time for which an ultrasonic wave is transmitted from an ultrasonic pen to each receiver, but the present disclosure uses a difference of a time for which an ultrasonic wave is transmitted from an ultrasonic pen to two sensors. Therefore, an effect of increasing a movement distance of an ultrasonic wave twice occurs, and so an effect that resolution increases twice as illustrated in FIGS. 4A and 4B occurs. That is, when a coordinate line using a reception time is represented using resolution of 20 μs, the coordinate line is arranged to be twice as dense in the present disclosure. Therefore, in a case of having the same time resolution, twice the resolution may be achieved.

Figure 5A:
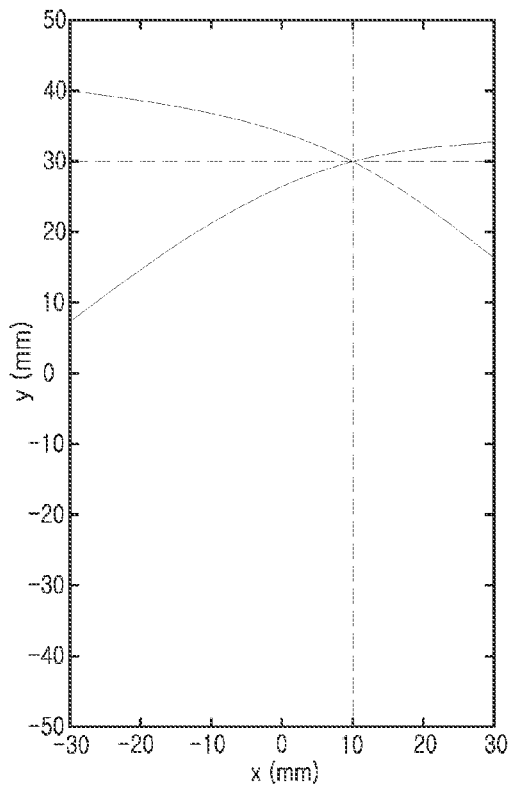
FIG. 5A is a graph illustrating an input error of a digital pen depending on a difference between an actual speed of sound and a speed of sound used for calculation according to the related art.
Figure 5A:
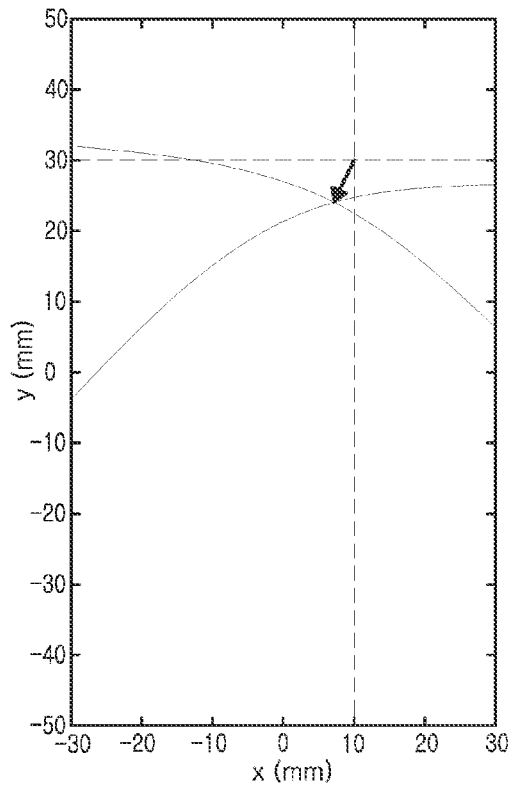
Figure 5B:
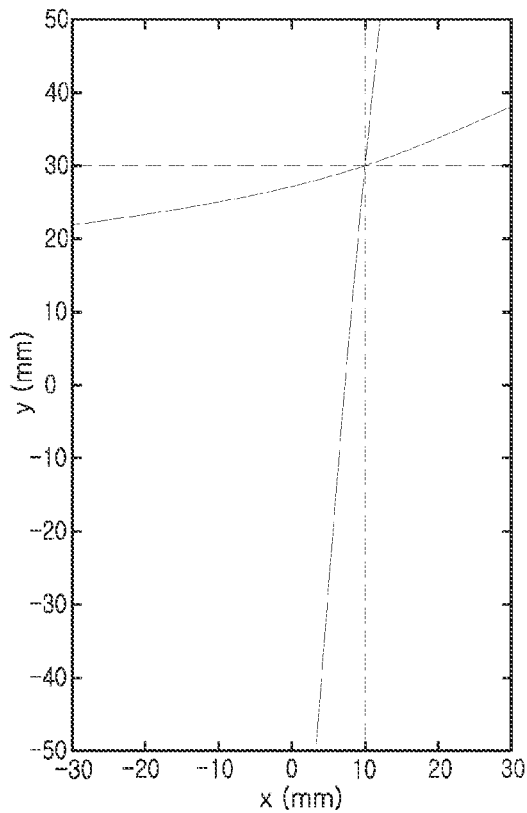
FIG. 5B is a graph illustrating an input error of a digital pen depending on a difference between an actual speed of sound and a speed of sound used for calculation according to an embodiment of the present disclosure.
Figure 5B:
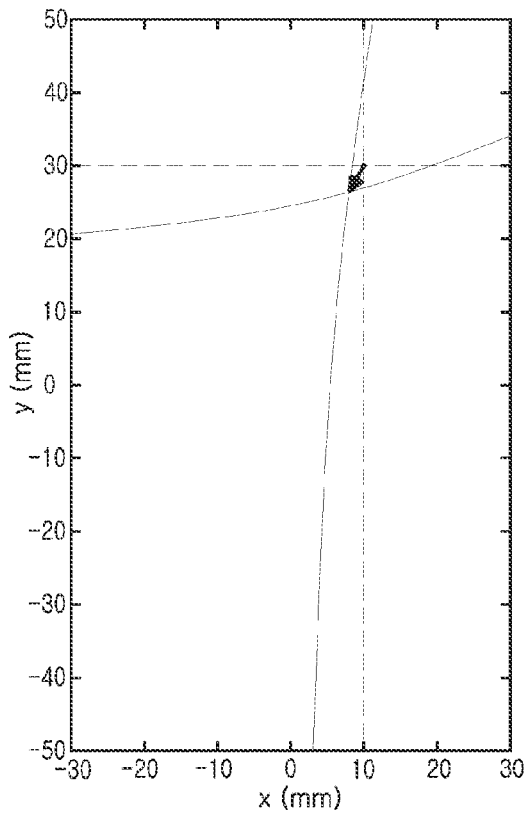

FIG. 5A illustrates an input error of a digital pen depending on a difference between an actual speed of sound and a speed of sound used for calculation according to the related art; and FIG. 5B illustrates an input error of a digital pen depending on a difference between an actual speed of sound and a speed of sound used for calculation according to an embodiment of the present disclosure.

Referring to FIGS. 5A and 5B, the present disclosure has an advantage of reducing a coordinate calculation error of a pen depending on a change of an environmental factor. In a case of an ultrasonic wave, a propagation velocity (speed of sound) changes depending on a kind, temperature, etc. of a medium. For example, as illustrated, in the case where a coordinate (x, y) of a digital pen is (10, 30), when the speed of sound used for calculation is 340 m/s, but the actual speed of sound is 370 m/s, FIGS. 5A and 5B compare errors between the related-art method and the present disclosure and show the present disclosure is much less influenced by a change of the speed of sound.

Meanwhile, an input error caused by a difference between the calculated speed of sound and the actual speed of sound may also be measured by adding one more reception sensor as described below.

Figure 6:
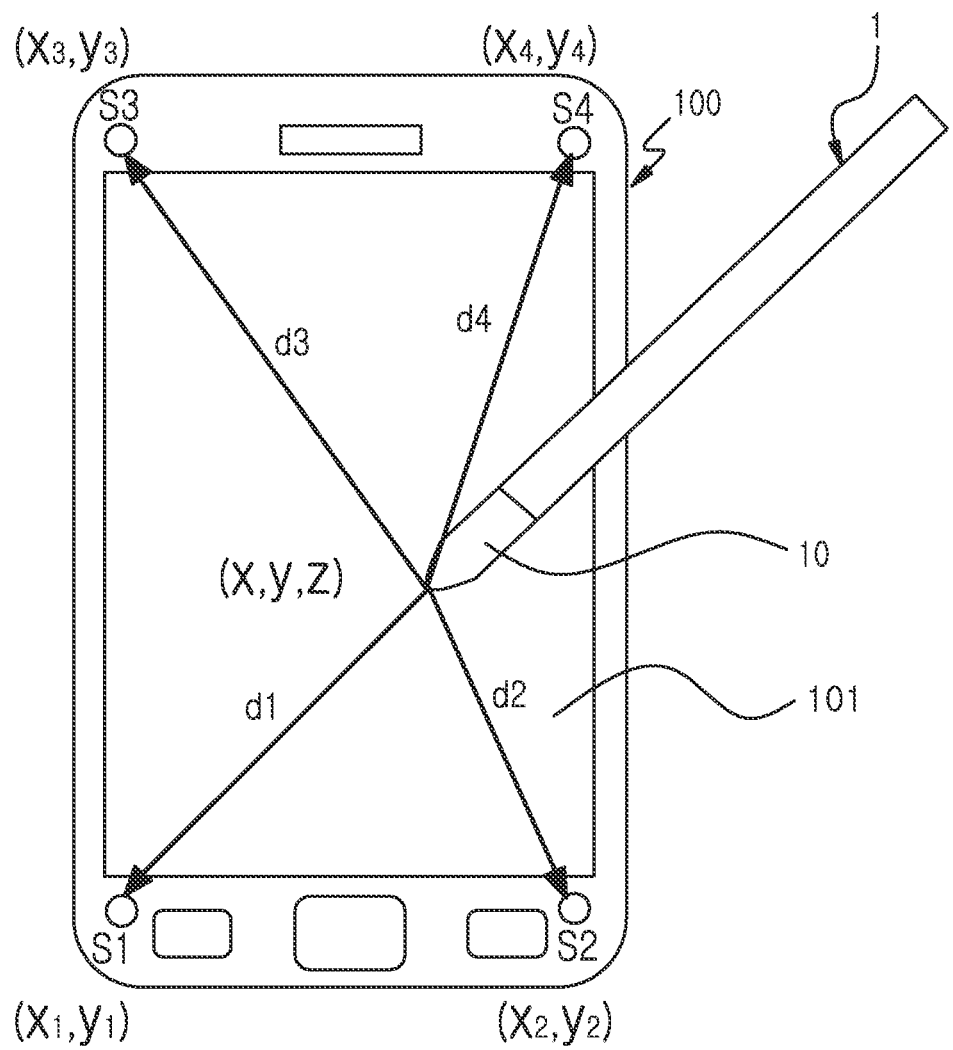
FIG. 6 is a view illustrating an electronic device including reception sensors disposed for correcting an input error generated in FIG. 5B and a digital pen according to an embodiment of the present disclosure.
Figure 7:
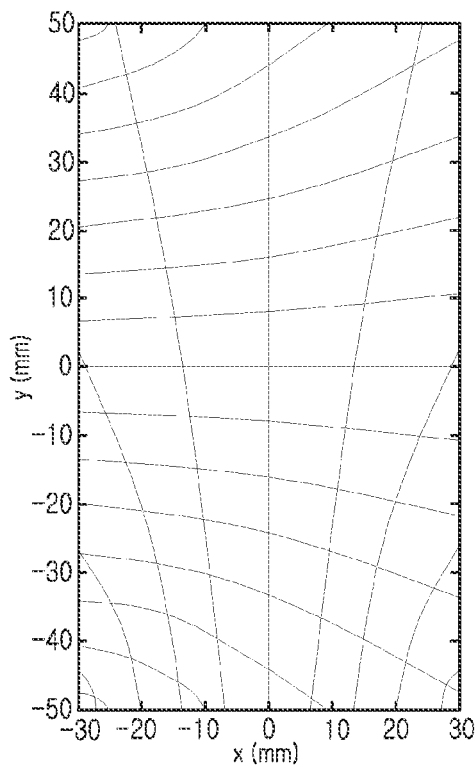
FIG. 7 is a view illustrating a coordinate system depending on an ultrasonic wave transfer time difference between the respective reception sensors of FIG. 6 according to an embodiment of the present disclosure.
Figure 7:
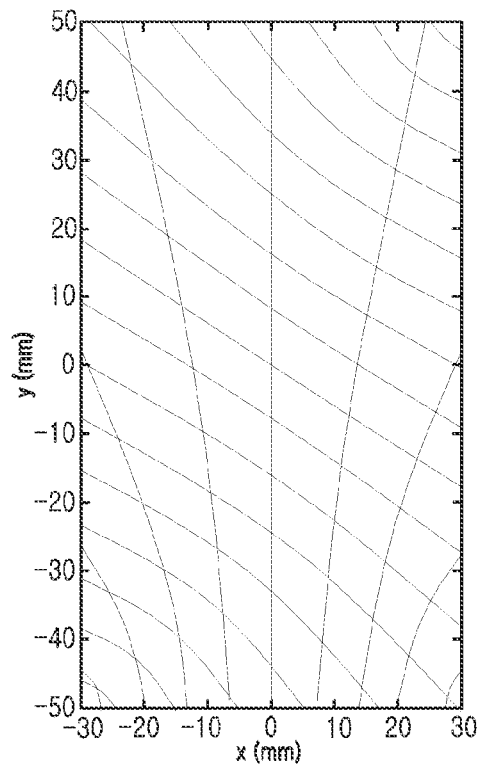

FIG. 6 is a view illustrating an electronic device including reception sensors disposed for correcting an input error generated in FIG. 5B and a digital pen according to an embodiment of the present disclosure; and FIG. 7 is a view illustrating a coordinate system depending on an ultrasonic wave transfer time difference between the respective reception sensors of FIG. 6 according to an embodiment of the present disclosure.

Figure 8A:
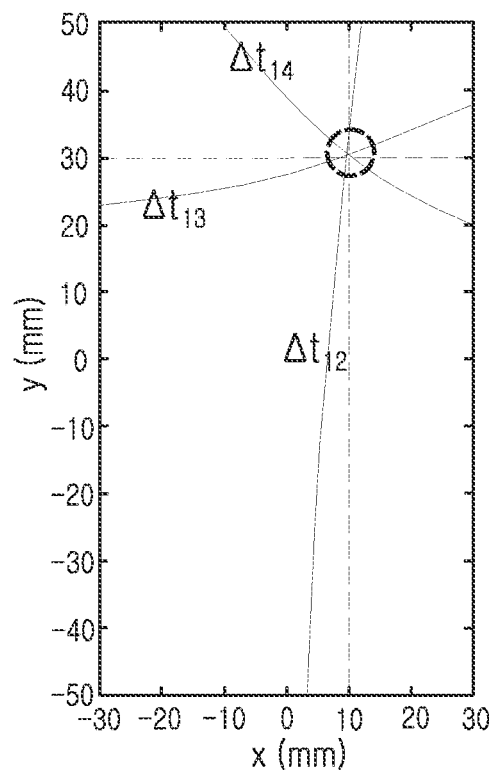
FIG. 8A is a graph illustrating an input point of a digital pen and an input point by calculation in a case where an actual speed of sound and a speed of sound used for calculation coincide according to an embodiment of the present disclosure.
Figure 8B:
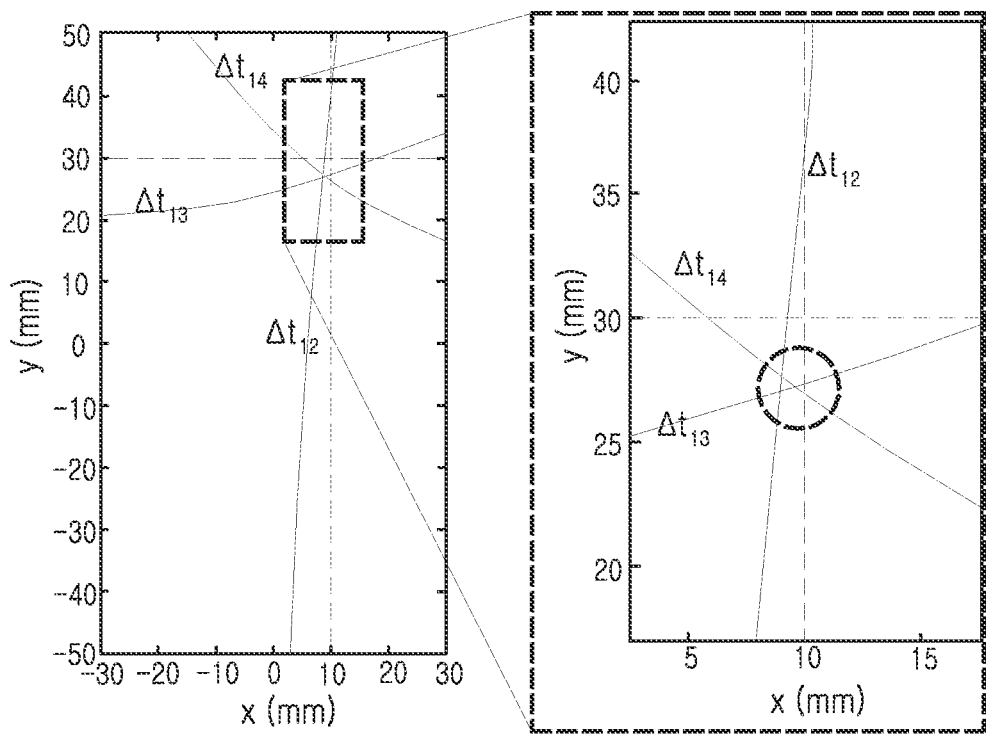
FIG. 8B is a graph illustrating an input error between an input point of a digital pen and an input point by calculation in a case where an actual speed of sound and a speed of sound used for calculation do not coincide according to an embodiment of the present disclosure.

FIG. 8A is a graph illustrating an input point of a digital pen and an input point by calculation in a case where an actual speed of sound and a speed of sound used for calculation coincide according to an embodiment of the present disclosure; and FIG. 8B is a graph illustrating an input error between an input point of a digital pen and an input point by calculation in a case where an actual speed of sound and a speed of sound used for calculation do not coincide according to an embodiment of the present disclosure.

Referring to FIGS. 6, 7, 8A, and 8B, assuming that times for which ultrasonic waves are transferred from the ultrasonic wave generator 10 of the digital pen 1 to the reception sensors S1, S2, S3, S4 (which are installed at the edge region excluding the display 101 of the electronic device 100) are t1, t2, t3, t4, differences between points at which an ultrasonic wave is received by the respective sensors are represented as follows.

$$\Delta t_{12} = t1 - t2$$

$$\Delta t_{13} = t1 - t3$$

$$\Delta t_{14} = t1 - t4$$

Also, when four reception sensors are used, three time differences having independence may be extracted. For example, when $\Delta t_{12}$, $\Delta t_{13}$, $\Delta t_{14}$ are used, a 2D plane may be represented using a coordinate system with three lines. Among them, when two are extracted and represented using a coordinate system, it may be represented as in FIG. 7. That is, hyperbolic coordinate systems may be formed with respect to each reception sensor and a corresponding sensor.

Here, assuming the calculated propagation velocity of an ultrasonic wave is Vs, and distances from the pen to the respective sensors are d1, d2, d3, d4, non-linear simultaneous equations of Equation (2) and non-linear simultaneous equations of Equation (3) may be formed as below.

$$\begin{aligned}
1) &\quad d1-d2=[(x-x_1)^2+(y-y_1)^2]^{1/2}-[(x-x_2)^2+(y-y_2)^2]^{1/2}=\Delta t_{12}Vs \\
2) &\quad d1-d3=[(x-x_1)^2+(y-y_1)^2]^{1/2}-[(x-x_3)^2+(y-y_3)^2]^{1/2}=\Delta t_{13}Vs
\end{aligned}$$
\hfill Equation (2)

where d1, d2, d3 are distances from the sensors S1, S2, S3 to a currently input pointing position of the digital pen, $(x_1, y_1)$ is a coordinate of the sensor S1, $(x_2, y_2)$ is a coordinate of the sensor S2, and $(x_3, y_3)$ is a coordinate of the sensor S3. Also, Vs is a velocity (for example, 340 m/s) of an ultrasonic wave used for a calculation equation in the electronic device. (x, y) is a current coordinate of the digital pen to detect.

$$\begin{aligned}
1) &\quad d1-d2=[(x-x_1)^2+(y-y_1)^2]^{1/2}-[(x-x_2)^2+(y-y_2)^2]^{1/2}=\Delta t_{12}Vs \\
2) &\quad d1-d4=[(x-x_1)^2+(y-y_1)^2]^{1/2}-[(x-x_4)^2+(y-y_4)^2]^{1/2}=\Delta t_{14}Vs
\end{aligned}$$
\hfill Equation (3)

where d4 is a distance from the reception sensor S4 to a currently input pointing position of the digital pen, and $(x_4, y_4)$ is a coordinate of the sensor S4.

Also, the coordinate (x, y) of the digital pen may be calculated using Equation (3) and Equation (4) as simultaneous equations. Since this calculation should solve non-linear equations, the equations should be solved with respect to $\Delta t_{12}$, $\Delta t_{13}$, $\Delta t_{14}$ in advance, and a high look-up table may be used.

In the case where coordinate values of the digital pen according to Equation (2) and Equation (3) are calculated as the same value, a line formed by $\Delta t_{12}$, $\Delta t_{13}$, $\Delta t_{14}$ passes through the same point as illustrated in FIG. 8A. That is, a coordinate system $(\Delta t_{12}, \Delta t_{13})$ and a coordinate system $(\Delta t_{12}, \Delta t_{14})$ of FIG. 7 represent the same point. Therefore, in this case, the speed of sound calculated by the electronic device and the actual speed of sound emitted from the digital pen coincide.

However, in the case where the actual speed of sound and the speed of sound used for calculation are different, that is, the coordinate values of the digital pen according to results of Equation (2) and Equation (3) do not coincide, $\Delta t_{12}$, $\Delta t_{13}$, $\Delta t_{14}$ do not overlap at one point as illustrated in FIG. 8B.

In this case, when coordinates calculated using $(\Delta t_{12}, \Delta t_{13})$ and $(\Delta t_{12}, \Delta t_{14})$ are different, the speed of sound used for calculation and the actual speed of sound are different. Then, the electronic device determines the speed of sound allowing the lines of $\Delta t_{12}$, $\Delta t_{13}$, $\Delta t_{14}$ to meet at one point while changing the speed of sound used for the calculation. For an algorithm for determining the actual speed of sound while changing the speed of sound, a variety of methods may exist. This means that fast calculated correction of the speed of sound is possible in an electronic device where at least four sensors are arranged even though the calculated speed of sound and the actual speed of sound are different.

That is, when the four reception sensors are used, a change in the speed of sound depending on an influence of an environment, etc. may be detected. An environment change generating a rapid change in the speed of sound almost does not occur even under an actual use condition, and the environment changes relatively slowly. Therefore, an algorithm for detecting and correcting a change in the speed of sound slowly operates in the background compared to a coordinate detect algorithm and may reduce an amount of operations of the processor of the electronic device.

Figure 9:
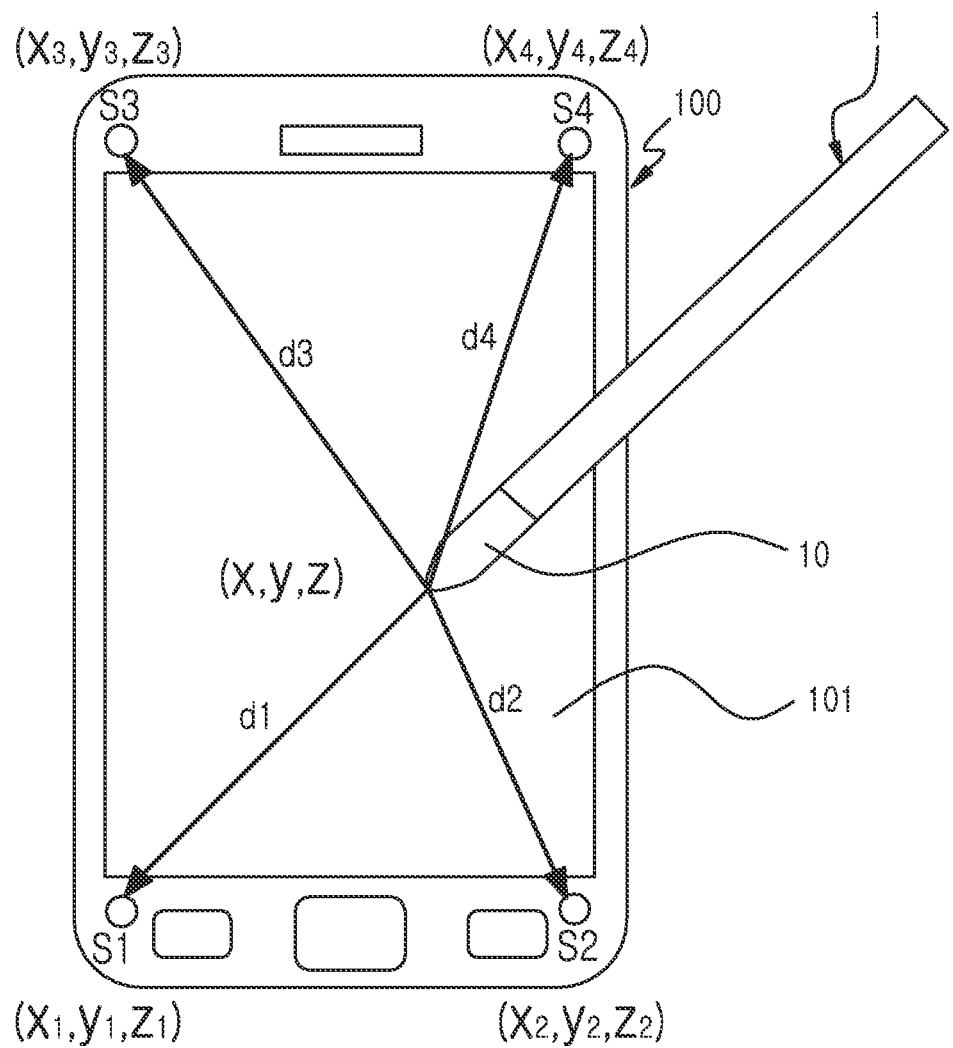
FIG. 9 is a view illustrating an electronic device illustrating a digital pen and arrangement of respective reception sensors for detecting a 3 Dimensional (3D) input coordinate on a space according to an embodiment of the present disclosure.

FIG. 9 is a view illustrating an electronic device illustrating a digital pen and arrangement of respective reception sensors for detecting a 3 Dimensional (3D) input coordinate on a space according to an embodiment of the present disclosure.

Referring to FIG. 9, a 2D coordinate on the display is obtained using three or more reception sensors, and four or more reception sensors are required to detect an error between the calculated speed of sound and the actual speed of sound. To detect the 3D coordinate of the digital pen, in the case where only a coordinate is calculated using the same principle, four or more receivers are required. To detect an error between the calculated speed of sound and the actual speed of sound, five or more reception sensors may be used.

Assuming that times for which an ultrasonic wave is transmitted from the ultrasonic wave generator 10 of the digital pen 1 to the reception sensors S1, S2, S3, S4 (which are installed at the edge region excluding the display 101 of the electronic device 100) are t1, t2, t3, t4 in FIG. 9, differences between points at which an ultrasonic wave is received by the respective sensors may be represented as follows.

$$\Delta t_{12} = t1 - t2$$

$$\Delta t_{13} = t1 - t3$$

$$\Delta t_{34} = t3 - t4$$

Here, assuming the calculated propagation velocity of an ultrasonic wave is Vs, and distances from the pen to the respective sensors are d1, d2, d3, d4, non-linear simultaneous equations of Equation (4) may be formed as below.

$$\begin{aligned}
1)\ & d1-d2 = [(x-x_1)^2 + (y-y_1)^2 + (z-z_1)^2]^{1/2} - [(x-x_2)^2 + (y-y_2)^2 + (z-z_2)^2]^{1/2} = \Delta t_{12} Vs \\
2)\ & d1-d3 = [(x-x_1)^2 + (y-y_1)^2 + (z-z_1)^2]^{1/2} - [(x-x_3)^2 + (y-y_3)^2 + (z-z_3)^2]^{1/2} = \Delta t_{13} Vs \\
3)\ & d3-d4 = [(x-x_3)^2 + (y-y_3)^2 + (z-z_3)^2]^{1/2} - [(x-x_4)^2 + (y-y_4)^2 + (z-z_4)^2]^{1/2} = \Delta t_{34} Vs
\end{aligned}$$

Equation (4)

where d1, d2, d3, d4 are distances from the sensors S1, S2, S3, S4 to a currently input pointing position of the digital pen, $(x_1, y_1, z_1)$ is a coordinate of the sensor S1, $(x_2, y_2, z_2)$ is a coordinate of the sensor S2, $(x_3, y_3, z_3)$ is a coordinate of the sensor S3, and $(x_4, y_4, z_4)$ is a coordinate of the sensor S4. Also, Vs is a velocity of an ultrasonic wave used for a calculation equation in the electronic device. (x, y, z) is a current coordinate of the digital pen to detect.

Also, a coordinate (x, y, z) of the digital pen may be calculated using Equation (4) as third degree simultaneous equations. Since this calculation should solve non-linear equations, the equations should be solved with respect to $\Delta t_{12}$, $\Delta t_{13}$, $\Delta t_{34}$ in advance, and a high look-up table may be used.

Meanwhile, according to the present disclosure, in the case where the tip of the digital pen is allowed to contact the surface of the display unit of the electronic device, pressure information of the tip is also modulated and included in a generated wave and transmitted.

Therefore, as described above, in the case where four sensors are used, when the pen contacts the surface of the display unit, not only a 2D coordinate of the pen but also the actual speed of sound may be measured, so that more accurate position may be detected. In the case where the pen is separated from the screen and moves, only a 3D coordinate may be calculated. However, since a user cannot clearly recognize an error of a 3D coordinate in most of electronic devices having a 2D screen, a problem in using the electronic device may not noticeably occur even though the actual speed of sound is corrected only at the point where the tip of the digital pen contacts the screen.

Figure 10:
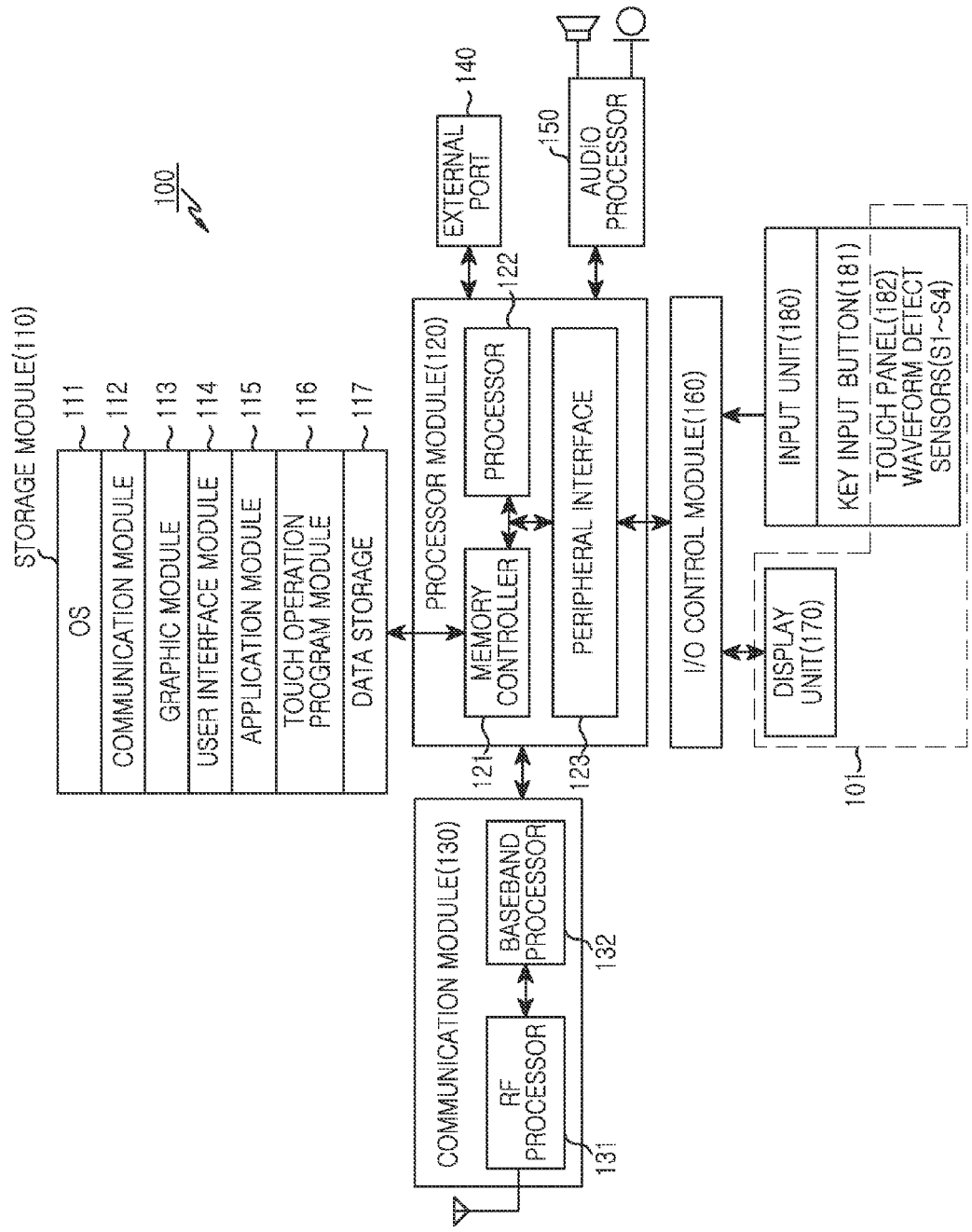
FIG. 10 is a block diagram illustrating an electronic device according to an embodiment of the present disclosure.

FIG. 10 is a block diagram illustrating an electronic device according to an embodiment of the present disclosure.

The electronic device 100 according to the present disclosure includes a storage module 110, a processor module 120, a communication module 130, an external port 140, an audio processor 150, an Input/Output (I/O) control module 160, a display unit 170, and an input unit 180. Here, a plurality of storage modules 110 and external ports 140 may exist, and the display unit is a display module and may include a Liquid Crystal Display (LCD) module.

The processor module 120 includes a memory controller 121, a processor 122, and a peripheral interface 123. Here, a plurality of processors 121 may exist.

The communication module 130 includes an RF processor 131 and a baseband processor 132.

The above-described element may be implemented as hardware such as one or more Integrated Circuits (IC) or software, or a combination of hardware and software.

Each element is described below.

The storage module 110 may include a program storage for storing a program for controlling an operation of a portable terminal, and a data storage 117 for storing data occurring during execution of a program. For example, the program storage includes an Operating System (OS) software module 111, a communication software module 112, a graphic software module 113, a user interface software module 114, at least one application software module 115, and a touch operation program module 116 according to the present disclosure.

The OS software module 111 includes at least one software element for controlling a general system operation. At this point, the OS software module 111 also performs a function for swift communication between a plurality of hardware (devices) and software elements.

The communication software module 112 includes at least one software element for processing data transmitted and received via the RF processor 131 or the external port 140.

The graphic software module 113 includes at least one software element for providing and displaying graphics on the display unit 170.

The user interface module 114 includes at least one software element related to the user interface.

The application software module 115 includes a software element for at least one application installed in the portable electronic device 100.

The touch operation program module 116 includes not only a software element for correcting a touch error recognized by a touch panel IC and a pen touch panel IC included in the I/O control module 160, but also various routines for supporting a composite touch operation resource in the case where the present disclosure uses an ultrasonic input method and a touch input method in a combination manner. For example, the touch operation program module 116 may include a routine for supporting to activate the touch panel 182 and the waveform detect sensors S1 to S4.

Furthermore, the touch operation program module 116 includes a routine supporting to discriminate the kind of input touch events by determining information corresponding to device information of the touch panel and device information of the digital pen based on the waveform detect sensors S1 to S4. Also, the above-described touch operation program module 116 may include a routine for discriminating a collected human body touch event by a user and a pen touch event, and a routine for operating discriminated touch events with reference to a predetermined touch operation table.

The memory controller 121 of the processor module 120 controls an access of the storage module 110 by other elements such as the processor 122 or the peripheral interface 123, and controls various signal flows required for supporting a composite touch operation and information collection and output according to the present disclosure.

When the waveform of the digital pen is detected by the sensors according to the present disclosure, the processor module 120 may drive a relevant look-up table to calculate a coordinate value of a currently input pointing position of the digital pen, and output corresponding data to the display unit. In addition, in a case of operating at least four reception sensors and calculating a 2D coordinate, the processor module 120 may drive a predetermined look-up table to calculate and compare the coordinates of the same digital pen at respective different positions. When the comparison values do not coincide, the processor module 120 may perform a correction operation that matches the actual speed of sound and the calculated speed of sound by changing the calculated speed of sound until the calculated respective different coordinate values coincide.

The peripheral interface 123 controls connection between I/O peripherals of the portable terminal 100 and the processor 122 and the storage module 110.

The processor 122 controls the portable terminal to provide various services such as voice communication and data communication using at least one software program. Also, the processor 122 executes a software module stored in the storage module 110 and controls to provide a multimedia service corresponding to the relevant software module.

The memory controller 121, the processor 122, and the peripheral interface 123 included in the processor module 120 may be implemented as a single chip or as separate chips.

The RF processor 131 of the communication module 130 processes an RF signal transmitted/received via an antenna. For example, the RF processor 131 converts a baseband signal provided from the baseband processor 132 to an RF signal and transmits the same via the antenna. Also, the RF processor 131 converts an RF signal provided via the antenna to a baseband signal and transmits the same to the baseband processor 132. Here, the RF processor 131 includes an RF transceiver, an amplifier, a tuner, an oscillator, a digital signal processor, a Coding Decoding (CODEC) chip set, a Subscriber Identity Module (SIM) card, etc.

The external port 140 includes a connection interface allowing the portable terminal to be directly connected with another device or to be connected with another device via a network. For example, the external port 140 may include a charge interface for charging of the electronic device.

The audio processor 150 forms an audio packet between a user and the portable electronic device 100 via a speaker and a microphone, and provides an audio interface.

The I/O control module 160 provides an interface between the display unit 170 including a display module, the I/O unit such as a key input button 181, the input unit 180 including the touch panel 182 and the waveform detect sensors S1 to S4 according to the present disclosure, and the peripheral interface 123. At this point, the I/O control module 160 may include a driver IC determining a touch coordinate depending on input information received from the touch panel.

The display unit 170 displays state information of the portable electronic device 100, a character input by a user, a moving picture, and a still picture, etc. under control of the graphic software module 113. Also, the display unit 170 displays touch information input via the touch panel of the input unit and the digital pen. The display 101 may include the display unit 170 and the touch panel 182.

Figure 11:
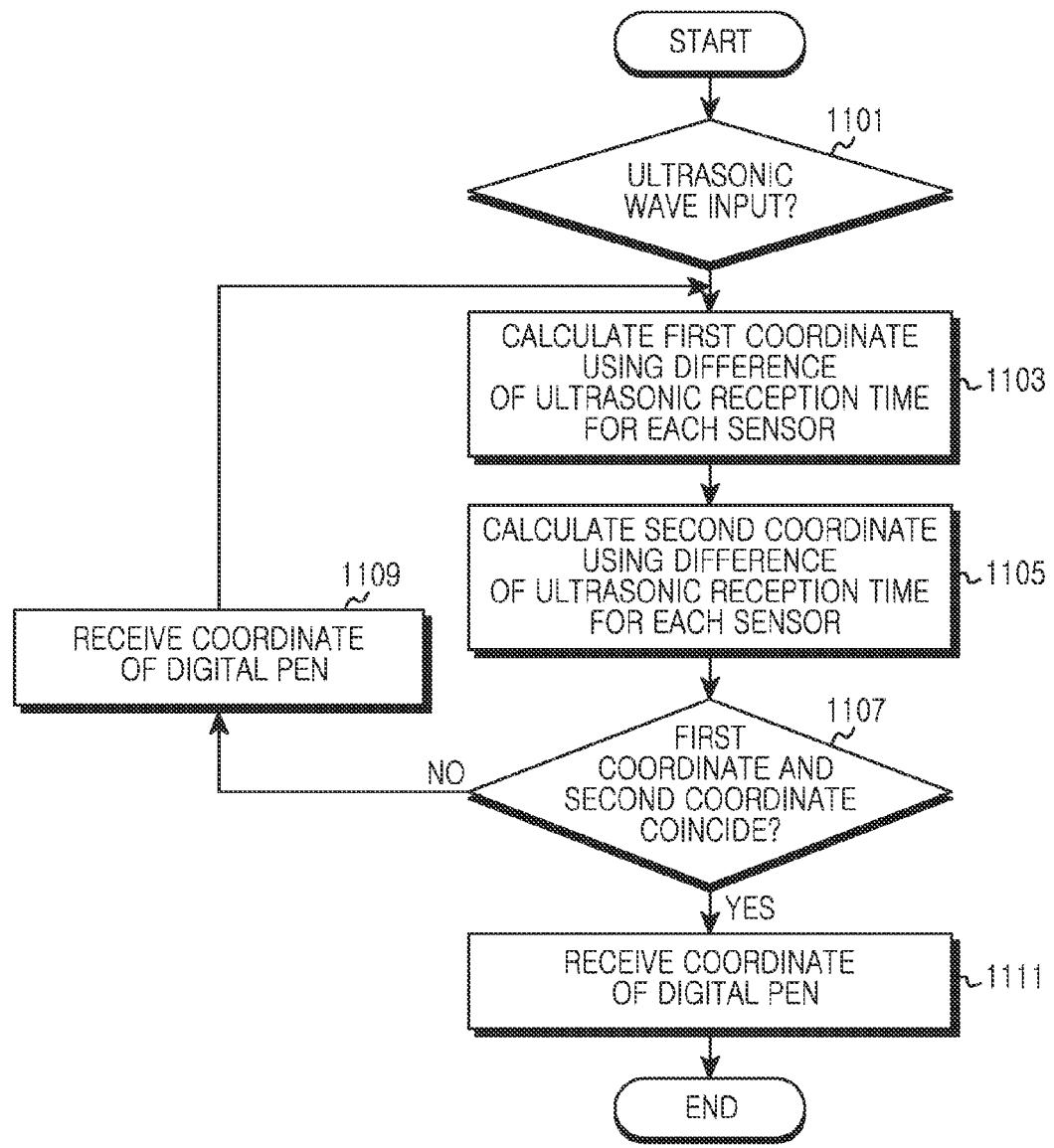
FIG. 11 is a flowchart illustrating a procedure for correcting an error of an input coordinate of a digital pen using a plurality of reception sensors according to an embodiment of the present disclosure.

FIG. 11 is a flowchart illustrating a procedure for correcting an error of an input coordinate of a digital pen using a plurality of reception sensors according to an embodiment of the present disclosure.

Referring to FIG. 11, first, the electronic device 100 determines whether an ultrasonic wave by the digital pen is input to sensors at operation 1101. This operation denotes, for example, that the electronic device has switched to an ultrasonic input mode and a user has performed an input operation with a digital pen. Here, in a case of a 2D input, this operation denotes a state where the tip of the digital pen contacts the display screen of the electronic device.

After that, the electronic device calculates a first coordinate of the digital pen using a difference of an ultrasonic wave reception time for each sensor at operation 1103. As described above, since a difference of an ultrasonic wave reception time between at least two sensors may be known using at least three reception sensors though a synchronization time for an initial input of the digital pen is not known, a coordinate value may be calculated using this.

After that, a second coordinate of the digital pen is calculated using a difference of the ultrasonic wave reception time for each sensor again at operation 1105. In this case, a difference of a reception time by an additional at least one reception sensor besides the above three reception sensors is calculated, so that the same input coordinate is calculated.

After that, the electronic device determines whether the first coordinate and the second coordinate coincide at operation 1107. When the first coordinate and the second coordinate coincide, it means the speed of sound which the electronic device has used for calculation and the speed of sound of an ultrasonic wave generated from the ultrasonic generating unit of the digital pen are the same. In this case, the electronic device enters operation 1111 to receive the input coordinate of the relevant digital pen and perform the relevant function. For this relevant function, various functions such as data input by a user, program execution, etc.

When the first coordinate and the second coordinate do not coincide at operation 1107, the processor of the electronic device determines the speed of sound which the electronic device has used for calculation and the speed of sound of an ultrasonic wave generated from the ultrasonic generating unit of the digital pen do not coincide, and proceeds to operation 1109 to change the speed of sound, and then performs operations from operation 1103 again to perform the correction process consistently until the first coordinate and the second coordinate coincide.

Though not shown, when the number of the reception sensors increases, the number of cases that may calculate the coordinate of the ultrasonic generating unit of the digital pen increases, so that more than the first and second coordinates may be calculated and a more accurate correction process may be performed.

Furthermore, though not shown, correction corresponding to calculation of a 3D coordinate may be performed using the above-described method.

Since the electronic device according to various embodiments of the present disclosure may detect the position of the digital pen using a difference of a reception time of a waveform transferred to the respective sensors when the electronic device only has the reception sensors capable of receiving a signal generated from the waveform generator of the asynchronous digital pen, a synchronization means that has been provided separately is excluded and so manufacturing costs are reduced and slimness of the device is achieved. Consequently, the present disclosure may contribute to securing reliability of the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising a digital pen, the electronic device comprising:
    at least three reception sensors installed in the electronic device at positions that are separated from one another, the at least three reception sensors configured to receive a waveform generated by a waveform generator of the digital pen; and
    a processor configured to determine an input coordinate of the digital pen using a difference of velocities and reception times of the waveform received by each of the at least three reception sensors,
    wherein the processor is configured to determine the input coordinate of the digital pen by calculating a 2-Dimensional (2D) input coordinate of the digital pen using a difference between transfer times of at least two cases of waveforms received by the at least three reception sensors, and
    wherein the input coordinate of the digital pen is calculated using non-linear simultaneous equations comprising:

1) $d1-d2=[(x-x_1)^2+(y-y_1)^2]^{1/2}-[(x-x_2)^2+(y-y_2)^2]^{1/2}=\Delta t_{12} Vs$ 2) $d1-d3=[(x-x_1)^2+(y-y_1)^2]^{1/2}-[(x-x_3)^2+(y-y_3)^2]^{1/2}=\Delta t_{13} Vs$ where d1, d2, d3 are respective distances from three reception sensors to a currently input position of the digital pen, $(x_1, y_1)$ is a coordinate of a first reception sensor, $(x_2, y_2)$ is a coordinate of a second reception sensor, and $(x_3, y_3)$ is a coordinate of a third reception sensor, Vs is a velocity of an ultrasonic wave set in advance and used for a calculation equation in the electronic device, x and y is a 2D input coordinate of the digital pen to detect, $\Delta t_{12}$ is a difference between waveform transfer times received by the first reception sensor and the reception second sensor, and $\Delta t_{13}$ is a difference between waveform transfer times received by the first reception sensor and the third reception sensor.

2. The electronic device of claim 1, wherein at least one of the at least three reception sensors is not disposed on a line between at least two other of the at least three reception sensors.

3. The electronic device of claim 1, wherein the waveform generator comprises an ultrasonic wave generating unit, and the at least three reception sensors comprise ultrasonic reception sensors.

4. The electronic device of claim 1, wherein the waveform generator comprises a vibration generating unit, and the at least three reception sensors comprise vibration reception sensors.

5. The electronic device of claim 1, wherein the waveform is generated in a form of a pulse or in a form of a modulated continuous wave.

6. The electronic device of claim 1, wherein correction of a 2-Dimensional (2D) input coordinate of the digital pen and a velocity of an actual waveform are calculated using a difference between transfer times of at least three cases of waveforms received by at least four reception sensors.

7. The electronic device of claim 6, wherein the correction of the input coordinate of the digital pen and the velocity of the actual waveform are calculated by comparing a first input coordinate of the digital pen calculated by first non-linear second degree simultaneous equations with a second input coordinate of the digital pen calculated by second non-linear second degree simultaneous equations,
    wherein the first non-linear second degree simultaneous equations comprise:

1) $d1-d2=[(x-x_1)^2+(y-y_1)^2]^{1/2}-[(x-x_2)^2+(y-y_2)^2]^{1/2}=\Delta t_{12} Vs$ 2) $d1-d3=[(x-x_1)^2+(y-y_1)^2]^{1/2}-[(x-x_3)^2+(y-y_3)^2]^{1/2}=\Delta t_{13} Vs$ where d1, d2, d3 are respective distances from three reception sensors to a currently input position of the digital pen, (x1, y1) is a coordinate of a first reception sensor, (x2, y2) is a coordinate of a second reception sensor, and (x3, y3) is a coordinate of a third reception sensor, Vs is a velocity of an ultrasonic wave set in advance used for a calculation equation in the electronic device, x and y is a second input coordinate of the current digital pen to detect, $\Delta t_{12}$ is a difference between waveform transfer times received by the first reception sensor and the second reception sensor, and $\Delta t_{13}$ is a difference between waveform transfer times received by the first reception sensor and the third reception sensor, and wherein the second non-linear second degree simultaneous equations comprise:

1) $d1-d2=[(x-x_1)^2+(y-y_1)^2]^{1/2}-[(x-x_2)^2+(y-y_2)^2]^{1/2}=\Delta t_{12} Vs$ 2) $d1-d4=[(x-x_1)^2+(y-y_1)^2]^{1/2}-[(x-x_4)^2+(y-y_4)^2]^{1/2}=\Delta t_{14} Vs$ where d1, d2, d4 are respective distances from three reception sensors comprising a fourth reception sensor to a currently input position of the digital pen, $(x_1, y_1)$ is the coordinate of the first reception sensor, $(x_2, y_2)$ is the coordinate of the second reception sensor, and $(x_4, y_4)$ is a coordinate of the fourth reception sensor, Vs is the velocity of the ultrasonic wave set in advance used for the calculation equation in the electronic device, x and y is the second input coordinate of the current digital pen to detect, $\Delta t_{12}$ is the difference between the waveform transfer times received by the first reception sensor and the second reception sensor, and $t_{14}$ is a difference between waveform transfer times received by the first reception sensor and the fourth reception sensor.

8. The electronic device of claim 7, wherein, when the first input coordinate and the second input coordinate calculated by the first non-linear second degree simultaneous equations and the second non-linear second degree simultaneous equations, respectively, are different, the velocity of the waveform is sequentially changed such that the first input coordinate and the second input coordinate coincide, so that the input coordinate of the digital pen is corrected.

9. A method for calculating an input coordinate of a digital pen having a waveform generator in an electronic device comprising at least three reception sensors, the method comprising:
   determining a difference of at least two reception times of waveforms received from each of the at least three reception sensors; and
   determining an input coordinate of the digital pen using the determined difference of at least two reception times and a velocity of the waveform set in advance,
   wherein the determining of the input coordinate of the digital pen comprises calculating a 2-Dimensional (2D) input coordinate of the digital pen using a difference between at least two cases of waveforms received by the at least three reception sensors, and
   wherein the input coordinate of the digital pen is calculated using non-linear simultaneous equations comprising:
   1) $d1-d2=[(x-x_1)^2+(y-y_1)^2]^{1/2}-[(x-x_2)^2+(y-y_2)^2]^{1/2}=\Delta t_{12} Vs$
   2) $d1-d3=[(x-x_1)^2+(y-y_1)^2]^{1/2}-[(x-x_3)^2+(y-y_3)^2]^{1/2}=\Delta t_{13} Vs$ where d1, d2, d3 are respective distances from three reception sensors to a currently input position of the digital pen, $(x_1, y_1)$ is a coordinate of a first reception sensor, $(x_2, y_2)$ is a coordinate of a second reception sensor, and $(x_3, y_3)$ is a coordinate of a third reception sensor, Vs is a velocity of an ultrasonic wave set in advance and used for a calculation equation in the electronic device, x and y is a 2D input coordinate of the digital pen to detect, $\Delta t_{12}$ is a difference between waveform transfer times received by the first reception sensor and the reception second sensor, and $\Delta t_{13}$ is a difference between waveform transfer times received by the first reception sensor and the third reception sensor.

10. The method of claim 9, wherein for the waveform generator, an ultrasonic wave generating unit is used, and for the at least three reception sensors, ultrasonic reception sensors are used.

11. The method of claim 9, wherein for the waveform generator, a vibration generating unit is used, and for the at least three reception sensors, vibration reception sensors are used.

12. The method of claim 9, further comprising:
   performing correction of a 2-Dimensional (2D) input coordinate of the digital pen and calculation of a velocity of an actual waveform using a difference between transfer times of at least three cases of waveforms received by at least four reception sensors.

13. The method of claim 12, wherein the correction of the input coordinate of the digital pen and the velocity of the actual waveform are calculated by comparing a first input coordinate of the digital pen calculated by first non-linear second degree simultaneous equations with a second input coordinate of the digital pen calculated by second non-linear second degree simultaneous equations,
   wherein the first non-linear second degree simultaneous equations comprise:
   1) $d1-d2=[(x-x_1)^2+(y-y_1)^2]^{1/2}-[(x-x_2)^2+(y-y_2)^2]^{1/2}=\Delta t_{12} Vs$
   2) $d1-d3=[(x-x_1)^2+(y-y_1)^2]^{1/2}-[(x-x_3)^2+(y-y_3)^2]^{1/2}=\Delta t_{13} Vs$ where d1, d2, d3 are respective distances from three reception sensors to a currently input position of the digital pen, $(x_1, y_1)$ is a coordinate of a first reception sensor, $(x_2, y_2)$ is a coordinate of a second reception sensor, and $(x_3, y_3)$ is a coordinate of a third reception sensor, Vs is a velocity of an ultrasonic wave set in advance used for a calculation equation in the electronic device, x and y is a second input coordinate of the current digital pen to detect, $\Delta t_{12}$ is a difference between waveform transfer times received by the first reception sensor and the second reception sensor, and $\Delta t_{13}$ is a difference between waveform transfer times received by the first reception sensor and the third reception sensor, and
   wherein the second non-linear second degree simultaneous equations comprise:
   1) $d1-d2=[(x-x_1)^2+(y-y_1)^2]^{1/2}-[(x-x_2)^2+(y-y_2)^2]^{1/2}=\Delta t_{12} Vs$
   2) $d1-d3=[(x-x_1)^2+(y-y_1)^2]^{1/2}-[(x-x_4)^2+(y-y_4)^2]^{1/2}=\Delta t_{14} Vs$ where d1, d2, d4 are respective distances from three reception sensors comprising a fourth reception sensor to a currently input position of the digital pen, $(x_1, y_1)$ is the coordinate of the first reception sensor, $(x_2, y_2)$ is the coordinate of the second reception sensor, and $(x_4, y_4)$ is a coordinate of the fourth reception sensor, Vs is the velocity of the ultrasonic wave set in advance used for the calculation equation in the electronic device, x and y is the second input coordinate of the current digital pen to detect, $\Delta t_{12}$ is the difference between the waveform transfer times received by the first reception sensor and the second reception sensor, and $\Delta t_{14}$ is a difference between waveform transfer times received by the first reception sensor and the fourth reception sensor.

14. The method of claim 13, wherein, when the first input coordinate and the second input coordinate calculated by the first non-linear second degree simultaneous equations and the second non-linear second degree simultaneous equations, respectively, are different, the velocity of the waveform is sequentially changed such that the first input coordinate and the second input coordinate coincide, so that the input coordinate of the digital pen is corrected.

15. The method of claim 9, further comprising, in a case where at least four reception sensors are used:
   when the digital pen contacts a display screen of the electronic device, correcting an input coordinate and a velocity of the waveform; and
   when the digital pen is spaced apart from the display screen of the electronic device, correcting a 3-Dimensional (3D) input coordinate of the digital pen or a 3D input coordinate and the velocity of the waveform.

16. The electronic device of claim 1, wherein the at least three reception sensors are disposed in a region of the electronic device other than a display region of a display unit of the electronic device.

* * * * *